(12) United States Patent
Kittmann

(10) Patent No.: US 10,766,670 B2
(45) Date of Patent: Sep. 8, 2020

(54) SNAP CAP IN MULTI-COMPONENT INJECTION MOLDING TECHNOLOGY

(71) Applicant: Roland Kittmann, Reichertshausen (DE)

(72) Inventor: Roland Kittmann, Reichertshausen (DE)

(*) Notice: Subject to any disclaimer, the term of this patent is extended or adjusted under 35 U.S.C. 154(b) by 0 days.

(21) Appl. No.: 15/774,067

(22) PCT Filed: Nov. 4, 2016

(86) PCT No.: PCT/DE2016/100523
§ 371 (c)(1),
(2) Date: May 7, 2018

(87) PCT Pub. No.: WO2017/076398
PCT Pub. Date: May 11, 2017

(65) Prior Publication Data
US 2018/0312307 A1 Nov. 1, 2018

(30) Foreign Application Priority Data
Nov. 6, 2015 (DE) .................... 20 2015 105 951 U

(51) Int. Cl.
*B65D 43/02* (2006.01)
*B65D 43/06* (2006.01)
(Continued)

(52) U.S. Cl.
CPC ...... *B65D 43/0212* (2013.01); *B29C 45/1676* (2013.01); *B65D 43/021* (2013.01);
(Continued)

(58) Field of Classification Search
CPC ........ B65D 51/242; B65D 2543/00092; B65D 2543/00296; B65D 2543/00314;
(Continued)

(56) References Cited

U.S. PATENT DOCUMENTS 1,437,572 A * 12/1922 Vons ...................... B65D 39/02
215/298
1,491,325 A * 4/1924 Thomas, Jr. ........... H02G 3/083
220/305
(Continued)

FOREIGN PATENT DOCUMENTS

DE 442634 A 4/1927
DE 19645263 A1 5/1998
(Continued)

*Primary Examiner* — Gideon R Weinerth
(74) *Attorney, Agent, or Firm* — Laurence A. Greenberg; Werner H. Stemer; Ralph E. Locher

(57) ABSTRACT

A cover includes a bistable flap mechanism made of a plastic with at least two material components. The cover can be produced in one piece in a multi-component injection molding technique. At a transitional area between a front wall and an edge portion, the plastic is sufficiently stiff (preferably due to greater material thickness) to ensure that an angle μ enclosed in the transitional area from the side wall to the edge portion remains constant in both bistable states. Expansion portions provided in the edge portion ensure that the outer circumference of the edge portion can increase/decrease from one bistable state to the other bistable state. A closing system including the cover is also provided.

19 Claims, 5 Drawing Sheets

(51) Int. Cl.
  *B65D 39/02* (2006.01)
  *B29C 45/16* (2006.01)
  *B65D 51/24* (2006.01)
  *B29K 75/00* (2006.01)
  *B29K 77/00* (2006.01)
  *B29K 509/08* (2006.01)
  *B29L 31/56* (2006.01)

(52) U.S. Cl.
  CPC ....... B65D 43/0202 (2013.01); B65D 51/242 (2013.01); *B29K 2075/00* (2013.01); *B29K 2077/00* (2013.01); *B29K 2509/08* (2013.01); *B29L 2031/565* (2013.01); *B65D 2543/0037* (2013.01); *B65D 2543/0049* (2013.01); *B65D 2543/00092* (2013.01); *B65D 2543/0099* (2013.01); *B65D 2543/00296* (2013.01); *B65D 2543/00314* (2013.01); *B65D 2543/00351* (2013.01); *B65D 2543/00537* (2013.01); *B65D 2543/00851* (2013.01); *B65D 2543/00935* (2013.01)

(58) Field of Classification Search
  CPC .. B65D 2543/00351; B65D 2543/0037; B65D 2543/0049; B65D 2543/00537; B65D 2543/00851; B65D 2543/00935; B65D 43/0212; B65D 43/021; B65D 21/08; B65D 43/0214; B65D 1/40; B29K 2077/00; B29K 2509/08; B29K 2075/00; B29C 45/1676; B29L 2031/565; Y10S 220/19; F16L 55/115; F16L 55/132; F16L 55/1141
  USPC ............ 220/212.5, 780, 784, 796, 287, 305; 215/301, 316, 317, 319, 320, 321, 270, 215/224, 298, 355, 358, 363
  See application file for complete search history.

(56) References Cited

U.S. PATENT DOCUMENTS

| | | | | |
|---|---|---|---|---|
| 1,589,134 A * | 6/1926 | Ewing | ............ | B65D 39/02 215/363 |
| 1,605,708 A * | 11/1926 | Clark | ............ | B65D 51/243 215/301 |
| 1,739,759 A * | 12/1929 | Hothersall | ....... | B65D 43/0212 220/281 |
| 1,773,513 A * | 8/1930 | Brady | ............ | B65D 43/0214 215/364 |
| 1,978,025 A * | 10/1934 | McCown | ....... | B65D 51/24 220/580 |
| 2,049,228 A * | 7/1936 | Sebell | ............ | B65D 43/0218 220/281 |
| 2,168,734 A * | 8/1939 | Freeman | ....... | B65D 41/225 215/270 |
| 2,212,804 A * | 8/1940 | Wynings | ....... | B65D 51/14 215/200 |
| 2,266,270 A * | 12/1941 | Roth | ............ | B65D 41/02 215/317 |
| 2,605,009 A * | 7/1952 | Landaal | ....... | B65D 81/22 215/231 |
| 2,628,739 A * | 2/1953 | Vischer, Jr. | ....... | A47J 36/06 220/305 |
| 2,639,058 A * | 5/1953 | Lobl | ............ | B65D 41/225 220/319 |
| 2,662,656 A * | 12/1953 | Beaubaire | ....... | B65D 39/02 215/270 |
| 2,671,574 A * | 3/1954 | Wolfe | ............ | B65D 43/022 220/234 |
| 2,756,793 A * | 7/1956 | Tupper | ....... | B65D 43/022 220/281 |
| 2,772,018 A * | 11/1956 | Weiss | ............ | B65B 31/047 220/231 |
| 2,968,047 A * | 1/1961 | Stilborn | ....... | A47K 1/14 4/295 |
| 3,070,224 A * | 12/1962 | Robinson | ....... | B65D 85/78 206/525 |
| 3,080,993 A * | 3/1963 | Livingstone | ....... | B65D 43/0208 220/305 |
| 3,104,681 A * | 9/1963 | Gray, Jr. | ....... | B65D 59/00 138/96 R |
| 3,164,289 A * | 1/1965 | Cocchiarella | ....... | B65D 43/26 220/578 |
| 3,170,588 A * | 2/1965 | Lyon, Jr. | ....... | B65D 43/0212 220/780 |
| 3,244,308 A * | 4/1966 | Esposito, Jr. | ....... | B65D 39/04 215/270 |
| 3,279,643 A * | 10/1966 | Amesbury | ....... | B65D 39/00 220/234 |
| 3,414,160 A * | 12/1968 | Weber | ............ | B65D 81/2038 220/203.18 |
| 3,559,843 A | 2/1971 | Kern | | |
| 3,578,203 A * | 5/1971 | Mainet | ............ | B29C 65/567 220/787 |
| 3,776,434 A * | 12/1973 | Christensen | ....... | B65D 39/16 222/525 |
| 3,782,575 A | 1/1974 | Braun | | |
| 3,853,237 A * | 12/1974 | Marchant | ....... | B65D 50/045 215/224 |
| 3,895,736 A * | 7/1975 | Swett | ............ | B65D 51/1694 220/782 |
| 3,934,745 A * | 1/1976 | Lovell | ............ | B65D 41/185 215/224 |
| 3,974,758 A * | 8/1976 | Stone, Jr. | ....... | A47G 19/14 99/275 |
| 4,027,776 A * | 6/1977 | Douglas | ....... | B65D 43/021 220/281 |
| 4,094,429 A * | 6/1978 | Urbin | ............ | B65D 39/04 215/305 |
| 4,180,178 A * | 12/1979 | Turner | ....... | B65D 43/0212 215/317 |
| 4,287,996 A * | 9/1981 | Wanderer | ....... | B65D 39/00 217/108 |
| 4,390,109 A * | 6/1983 | Schulein | ....... | B65D 39/12 220/234 |
| 4,413,748 A * | 11/1983 | Kessler | ....... | B65D 43/021 220/212.5 |
| 4,426,014 A * | 1/1984 | Coltman, Jr. | ....... | B65D 43/022 215/DIG. 1 |
| 4,723,674 A * | 2/1988 | Nunes | ............ | B65D 39/02 215/231 |
| 5,224,515 A * | 7/1993 | Foster | ............ | B65D 59/06 138/89 |
| 5,799,814 A | 9/1998 | Schaefer et al. | | |
| 6,260,723 B1 | 7/2001 | Bergholtz | | |
| 6,907,918 B2 * | 6/2005 | Connors | ............ | F28D 15/0283 165/104.21 |
| 6,935,380 B2 * | 8/2005 | Rahimzadeh | ....... | F16L 55/115 138/89 |
| 8,072,749 B1 * | 12/2011 | Chen | ............ | G06F 1/1626 312/223.1 |
| 8,403,174 B2 * | 3/2013 | Blake | ............ | B65D 51/1694 215/320 |
| 8,820,553 B2 | 9/2014 | Endert | | |
| 9,051,095 B2 * | 6/2015 | Antal, Sr. | ....... | B65D 43/0212 |
| 9,366,374 B2 * | 6/2016 | Krauer | ....... | F16L 55/115 |
| 9,457,939 B1 * | 10/2016 | Peters | ....... | B65D 41/023 |
| 9,630,752 B2 * | 4/2017 | Kooney | ....... | B65D 43/0212 |
| 9,771,187 B2 * | 9/2017 | FitzSimons | ....... | B65D 41/22 |
| 10,390,561 B2 * | 8/2019 | Nersing | ....... | A24F 23/00 |
| 2003/0019878 A1 * | 1/2003 | Scarabelli | ....... | B65D 1/22 220/796 |
| 2004/0206765 A1 * | 10/2004 | McMahon, III | ... | B65D 43/0222 220/780 |
| 2006/0261065 A1 * | 11/2006 | Claypool | ....... | B65D 43/021 220/212 |

(56) References Cited

U.S. PATENT DOCUMENTS

| | | | | |
|---|---|---|---|---|
| 2007/0007299 A1* | 1/2007 | Ohler | B65D 43/0214 | |
| | | | | 220/806 |
| 2008/0041869 A1* | 2/2008 | Backaert | B65D 39/025 | |
| | | | | 220/804 |
| 2008/0047965 A1* | 2/2008 | Gu | B65D 51/1694 | |
| | | | | 220/634 |
| 2009/0289074 A1* | 11/2009 | McNamara | B65D 43/0212 | |
| | | | | 220/780 |
| 2012/0037654 A1 | 2/2012 | McNamara | | |
| 2014/0076894 A1* | 3/2014 | Chen | B65D 81/2015 | |
| | | | | 220/203.19 |
| 2018/0155097 A1* | 6/2018 | Hinnerud | B65D 21/08 | |
| 2018/0168222 A1* | 6/2018 | Nersing | A24F 23/00 | |
| 2019/0193900 A1* | 6/2019 | Kittmann | B65D 43/0235 | |
| 2019/0202590 A1* | 7/2019 | Hwang | B65D 51/16 | |
| 2019/0241327 A1* | 8/2019 | Loveridge | A47J 47/10 | |

FOREIGN PATENT DOCUMENTS

| | | |
|---|---|---|
| DE | 102010016711 A1 | 11/2011 |
| DE | 102015103036 A1 | 9/2016 |
| EP | 2291315 B1 | 2/2013 |
| GB | 845457 A | 8/1960 |
| GB | 1212270 A | 11/1970 |
| GB | 2395710 A | 6/2004 |
| WO | 2014090399 A2 | 6/2014 |

\* cited by examiner

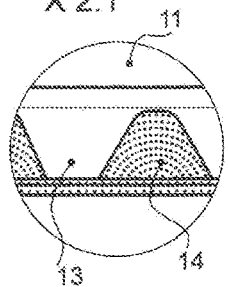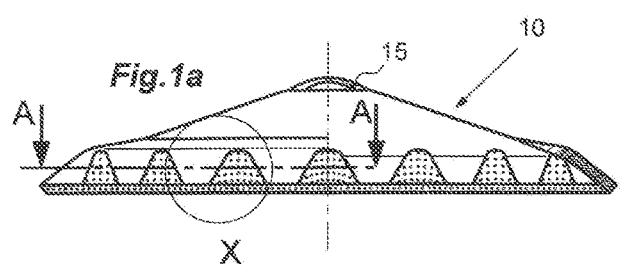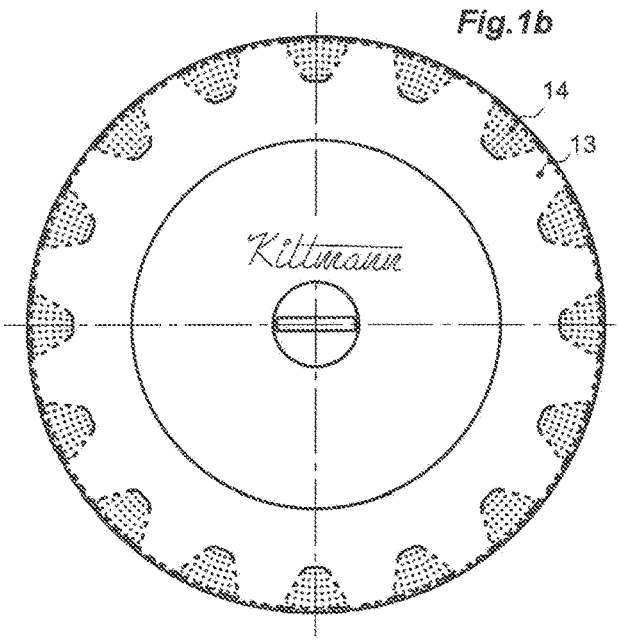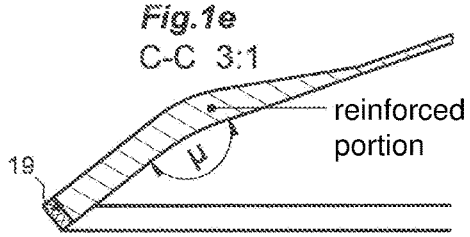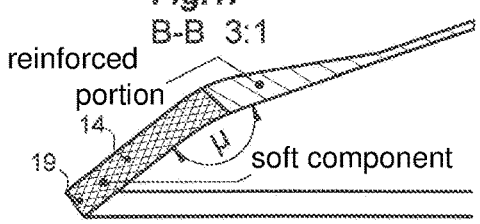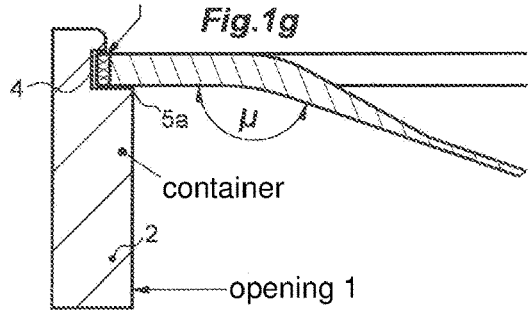

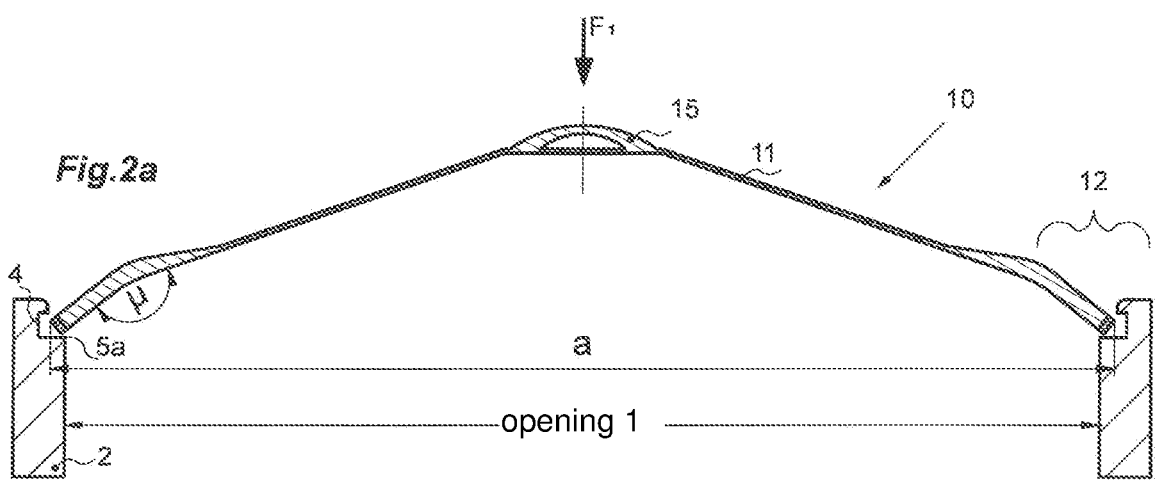
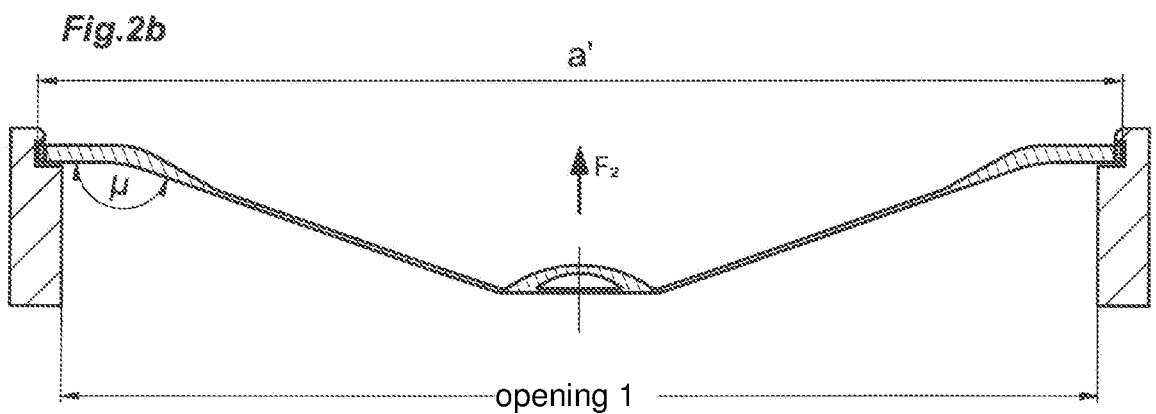
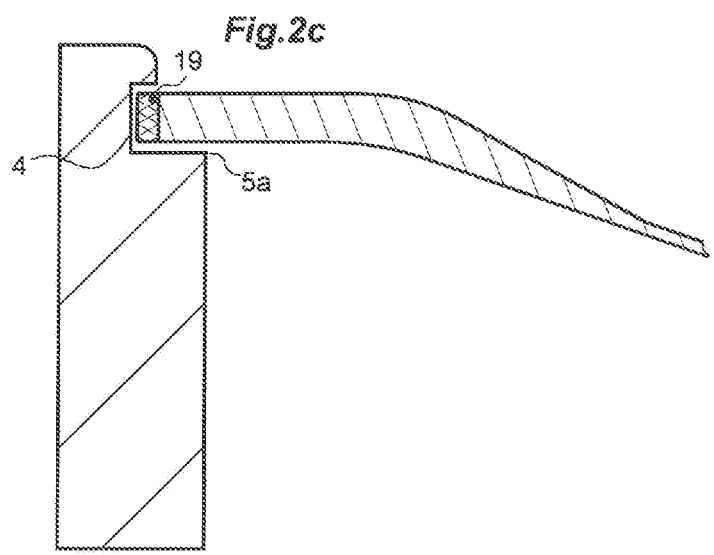

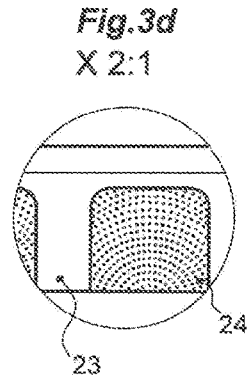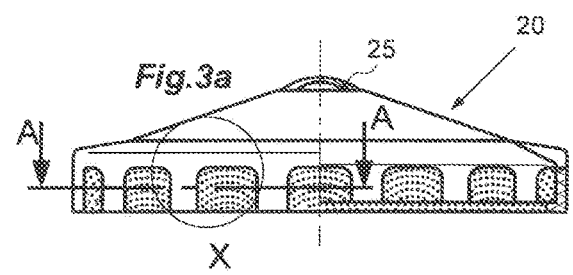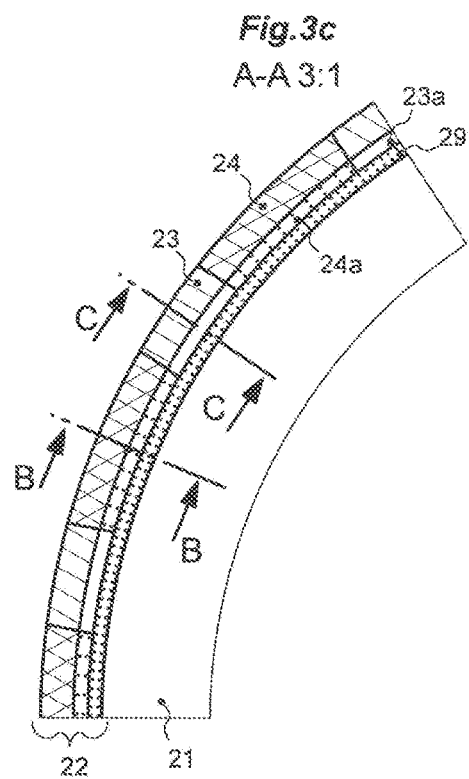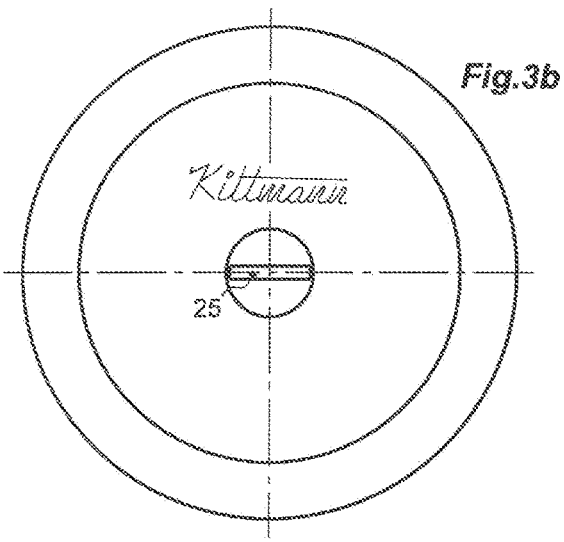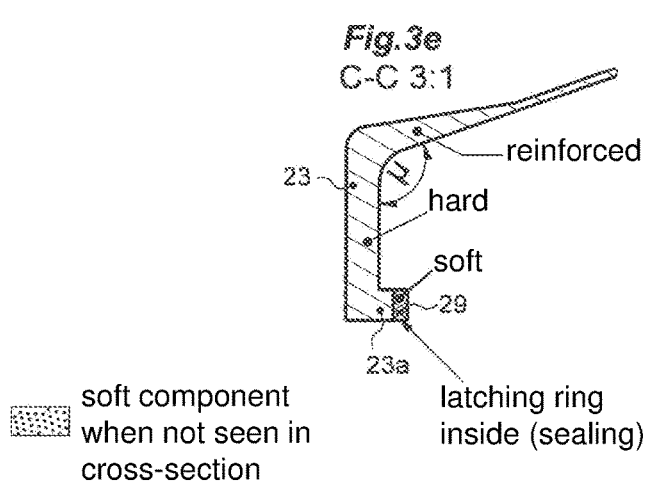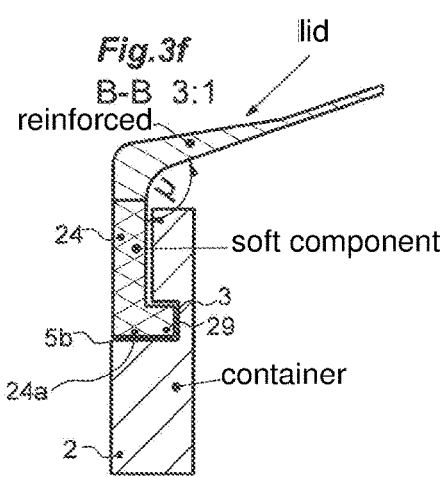

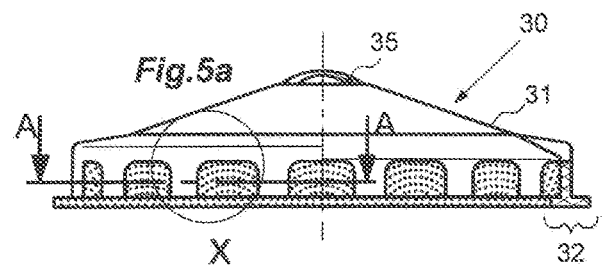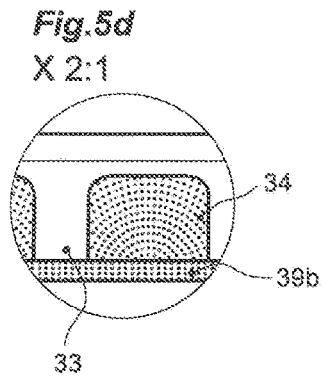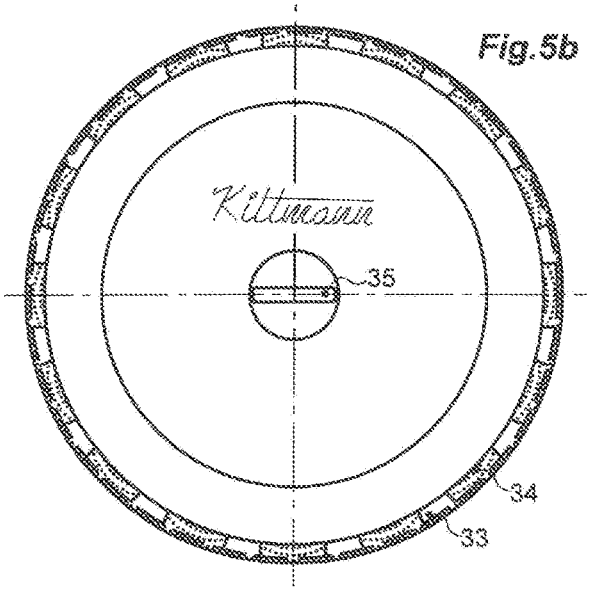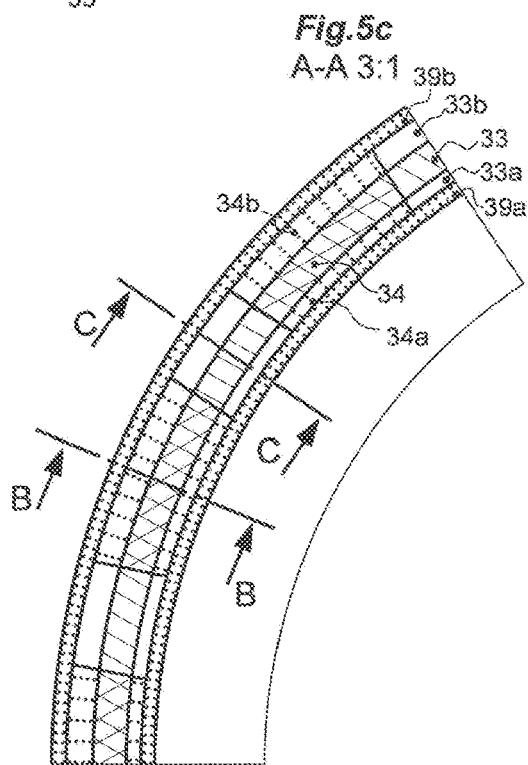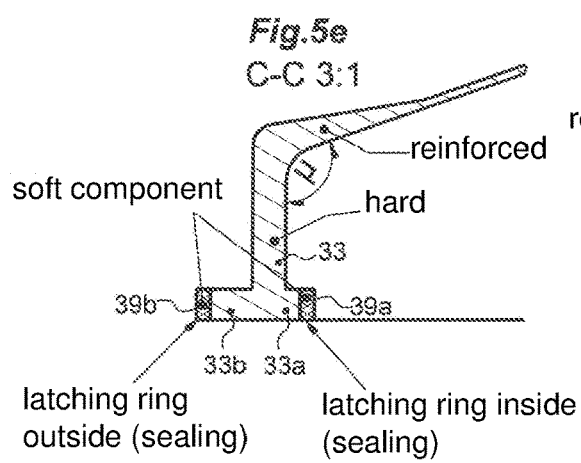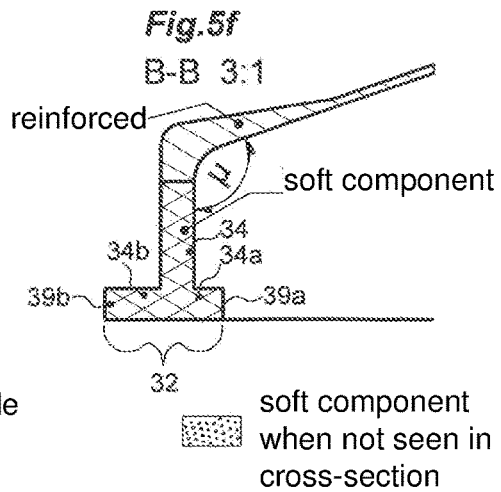

SNAP CAP IN MULTI-COMPONENT INJECTION MOLDING TECHNOLOGY

BACKGROUND OF THE INVENTION

Field of the Invention

Since the 1920s, it has been known to make small round metal cans with a snap closure that can be opened and closed in bistable fashion by pressure on its front wall. Such snap closures are described, for example, in the patent document DE 442 634 C and consist of a circular front wall, which is deformable in a bistable manner between a convex and a concave state, and a peripheral edge portion of crenel-like spread fingers, which are designed to embrace in the closure position an embossment formed on the outer edge of the metal can.

Such metal cans of tinplate are sold, for example, by the company Hoffmann Neopac as merchandising products under the brands Klick-Klack® Klipp-Klapp®. A more detailed description of the cans can be found, for example, in the patent document EP 2 291 315 B1.

In the prior art, it has not yet been recognized or at least not described, that for the functioning of the snap mechanism of the above-mentioned can closures the transfer of the bistable deformation of the front wall on the adjacent annular edge portion is crucial. Only if the flipping-over movement between the convex and concave curvature of the front wall transmits its deformation stress forces to the edge portion, it can lead to a spreading of the metal crenels and a corresponding increase in the outer circumference of the closure cap, which then also allows opening of the metal can. It is of central importance that the angle enclosed at the transition part between the front wall and the edge portion is the same for both bistable states, i.e. the closure cap material is stiff enough at this transition part to fully transmit the deformation of the front wall to the edge portion.

In the aforementioned metal can caps the required material rigidity in the transition part between the front wall and the edge portion is already achieved by the fact that the can cap is formed from one piece of sheet metal by bending the edge region and punching the metal crenels. Due to the bending hardening of the material at the transition between the front wall and the edge portion, the required material rigidity is achieved automatically.

SUMMARY OF THE INVENTION

The known click-clack caps, however, suffer from the disadvantage that they are so far only available in metal material, especially tinplate. There is generally a need for their manufacture from cheaper and lighter plastic materials. Furthermore, it is desirable to be able to produce such cans so that they have in their closed state a front wall with concave curvature, for which any unintentional opening gets difficult. Finally, it would be desirable to make such closure elements as air-tight and waterproof as possible in order to expand their applicability beyond the previous range as pill boxes.

The above-mentioned object is solved at least partially by a cover for attachment to an opening to be closed, comprising:

a front wall which is bistably deformable between a first state which is cambered in the direction of attachment and a second state which is cambered opposite to the direction of attachment, an annular edge portion having a larger outer circumference in the first bistable state than in the second bistable state and therefore being adapted to effect a clamping attachment of the cover to a wall region of the opening by pressing the edge portion in the first state from inside or in the second state from outside against the wall region, and the edge portion having at least one expansion portion made of a second material component which is softer than a first material component from which the remaining edge portion is made, and which enables an increase of the outer periphery of the edge portion in the first bistable state relative to the second bistable state. The dependent claims relate to preferred embodiments.

For a successful production of the caps from plastics, it has turned out to be important to gain and implement the understanding that the outer circumference of the lid must be changeable and at the same time the angle at the transition part between the front wall and the edge portion must remain constant in both bistable positions. In the conventional metal can closure, the first of these boundary conditions was deliberately fulfilled by the spreadable metal crenels. The second boundary condition was more or less coincidentally fulfilled by the fact that the tinplate material in the transitional area becomes sufficiently stiff due to the hardening caused by the material bending process already.

In the production of a thin-walled plastic, however, the same type of material treatment would not lead to a successful result. Cutting the edge area in the shape of the conventional crenels would make the cover too unstable. In addition, no hardening occurs in the bending process during the production as in metalworking. The boundary conditions must therefore be met by other means.

This is achieved according to the invention in that at least one expansion portion in the edge portion of the cover is made of a softer material than the remaining edge portion. The expansion portion elastically expands under tension and allows the edge portion to widen in the condition of concave front wall curvature, while the base material (i.e. a first material component) of the cover is otherwise stiff enough to maintain the angle in the transition region between the front wall and the edge portion constant. This enables the cover to flip over into the bistable state with the larger outer circumference.

Preferably, the expansion portion is formed together with the rest of the cover made in one piece in a multi-component injection molding process. For the expansion portion, a second material component is then injected which is softer and/or more elastic than the first material component used for the remaining cover. In order to further support the constant angle in the transitional area between the front wall and the edge portion, the cover in this transitional area can preferably have a higher material thickness of the harder (base) material component than in the main area of the front wall or be injection-molded from an even harder third material component. This leads to the particular advantage that the cover as a whole has a constant material thickness. A homogeneous thickness is not only visually appealing, but also reduces the number of steps and edges where debris is collected.

According to a particularly preferred embodiment, the front wall further comprises a handle member by which the front wall can be easily lifted and pressed by hand. This is particularly important when the closure element is not engaging from the outside as a cap on the opening to be closed, but engages as a lid from inside into the side wall of the opening to be closed. In the closed state, the lid could then no longer be removed from the opening without a suitable handle member. The handle member provides the further advantage that it reinforces the center region of the front wall, which should remain as rigid as possible in its horizontal orientation during the folding process between the convex and concave positions.

Particularly preferred is an embodiment of the present invention, in which a latching ring made of the softer second material component is injection-molded on the entire outer circumference of the edge portion. This ring can sealingly engage into a groove or a step in the side wall of the opening to be closed, so that even a sealing closure of the opening is possible. This idea of a seal was not possible in the case of the conventional metal closure caps because they always came into contact with the metal from outside and the metal crenels arranged in a star-shaped manner at the edge portion did not permit a sealing configuration.

In the present description, the closure element of the opening to be closed is generally referred to as a cover. If the clamping attachment of the cover engages on the opening wall from outside, the cover is called a cap; on the other hand, if the cover clamps against the opening wall from inside, it is called a lid.

BRIEF DESCRIPTION OF THE SEVERAL VIEWS OF THE DRAWING

In the following, the invention will be explained in more detail with reference to several embodiments:

FIG. 1a shows a side view, partially in section, of a closure lid according to a first embodiment of the invention;

FIG. 1b is a plan view of the lid of FIG. 1a;

FIG. 1c is an enlarged detail view in a section A-A in FIG. 1a;

FIG. 1d is an enlarged view of a detail X of FIG. 1a;

FIG. 1e is an enlarged detail view in a section C-C in FIG. 1c;

FIG. 1f is an enlarged detail view in section B-B in FIG. 1c;

FIG. 1g shows a representation of the closing principle of an opening with the cover according to the detail view in FIG. 1e in the opposite bistable position;

FIG. 2a is a cross-sectional view of a closure system according to the present invention with a variant of the cover according to the first embodiment in the open position;

FIG. 2b is a cross-sectional view of the closure system of FIG. 2a in the closed position;

FIG. 2c is an enlarged detail of FIG. 2b;

FIG. 3a shows a partially sectioned side view of a closure cap according to a second embodiment of the invention;

FIG. 3b is a plan view of the cap of FIG. 3a;

FIG. 3c is an enlarged detail view in section A-A in FIG. 3a;

FIG. 3d is an enlarged view of a detail X of FIG. 3a;

FIG. 3e is an enlarged detail view in section C-C in FIG. 3c;

FIG. 3f is an enlarged detail view in section B-B in FIG. 3c, in which the closure principle of an opening with the cap is simultaneously shown;

FIG. 5a is a partially sectioned side view of a cover according to a third embodiment of the invention;

FIG. 5b is a plan view of the cover of FIG. 5a;

FIG. 5c is an enlarged detail view in section A-A in FIG. 5a;

FIG. 5d is an enlarged view of a detail X of FIG. 5a;

FIG. 5e is an enlarged detail view in section C-C in FIG. 5c; and

FIG. 5f is an enlarged detail view in a section B-B in FIG. 5c.

DESCRIPTION OF THE INVENTION

Figure 4A:
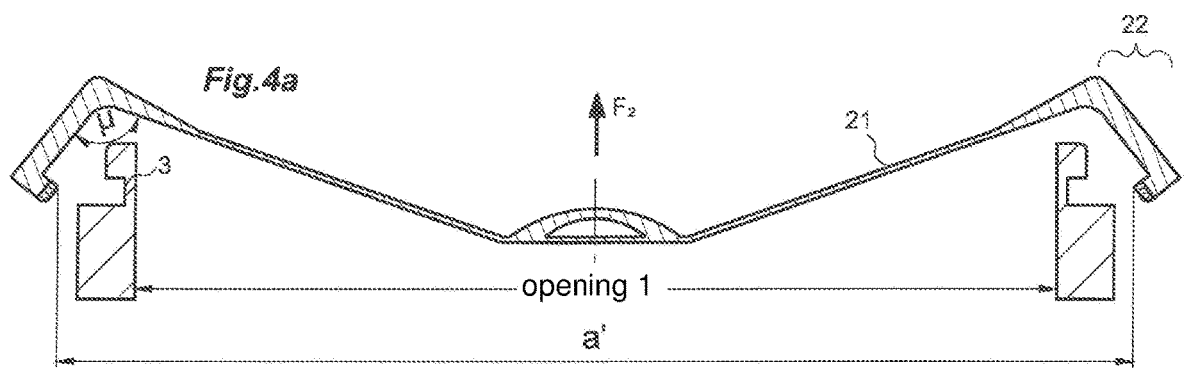
FIG. 4a is a cross-sectional view of a closure system according to the present invention with a variant of the cover according to the second embodiment in the open position.

The lid 10 shown in FIGS. 1a-d has a front wall 11 of substantially circular basic shape, at the peripheral edge of which an annular edge portion 12 is formed. FIG. 1a shows a partially sectioned side view. In the left half of the Figure, the lid 10 is seen from the side, while it is shown at an inside cut in the right half, so that the rear inner side of the lid 10 becomes visible. The same applies to the later explained representations of the cap 20 in FIG. 3a and the cover 30 in FIG. 5a. Further, in all figures the unsectioned soft component (second material component) is drawn dotted and the sectioned soft component is drawn crosshatched, while the sectioned hard component (first material component) is hatched with a single line.

The lid 10 is shown in FIGS. 1a to 1f in its open position, i.e. the front wall 11 is, as seen in FIG. 1a, in its convex, upwardly cambered bistable state. If the front wall 11 snaps into its concave state downwardly cambered (in the attachment direction), the outer circumference of the edge portion 12 increases so that a radial end of the edge portion 12 can engage with an inner groove 4 in the wall region 2 of the opening 1 to be closed, as shown in FIG. 1g.

In order to keep the angle μ, which is included between the front wall 11 and the edge portion 12 in their transition region, constant in the two positions of FIGS. 1e and 1g, the lid material should have sufficient rigidity. According to the present invention, this is achieved in that the transition part between the front wall 11 and the edge portion 12 has at least in parts, but preferably over the entire circumference, a higher material thickness than the central region of the front wall 11. The material thickens outwardly, as shown in FIGS. 1e-g opposite to the direction of attachment, so that the transitional area between the front wall 11 and the edge portion 12 runs smooth inside. Alternatively, the material thickenings can also project inwards and lead to a corresponding contour of the wall in the interior of the lid. Then the transitional area is smooth on the outside, resulting in a particularly homogeneous appearance.

The enlargement of the outer circumference in the concave bistable state shown in FIG. 1g with respect to the convex state shown in FIG. 1e requires a sufficient expansion flexibility of the peripheral edge portion 12. This is achieved according to the invention by circumferentially (preferably equidistantly) arranged expansion portions 14 of the softer second material component, which—as can be seen particularly well in FIGS. 1a-d-alternate with intermediate portions 13 of the harder first material component. As shown in FIG. 1b, the expansion portions 14 start at the transition region between the front wall 11 and the edge portion 12 and widen towards the radial outer edge.

The edge portion 12 terminates both in its expansion portions 14 and in its intermediate portions 13 in a circumferential latching ring 19, which is also formed of a softer material component, preferably the same as the expansion portions 14. This circumferential latching ring 19 gives the thin-walled cover 10 additional dimensional stability, but is also sufficiently elastic to allow the enlargement of the outer periphery in the convex folding position shown in FIG. 1g.

Because of its softer material properties, the latching ring 19 not only clamps particularly well into the inner groove 4 of the opening wall 2 to be closed, but can even take over the function of a sealing ring.

Finally, the cover 10 also has a handle member in the form of a strap or shackle 15. The handle member can be safely and reliably taken by hand or with a hook or the like to put the lid 10 onto the opening 1 to be closed and to withdraw it again without lateral tilting.

As a manufacturing method for the lid 10, the already mentioned multi-component injection molding of one or more thermoplastics is particularly well-suited. By the multi-component technique, a first (base) component can be injected for the front wall 11 and the intermediate portions 13, while the expansion portions 14 as well as the latching ring 19 are molded directly from a softer second component in a single manufacturing process. The optional third (especially hard) material component for the transitional area between the front wall and the edge portion can also be injection-molded integrally in a single multi-component injection molding.

Preferred materials for the first component are: thermoplastic elastomers (TPE) and thermoplastic urethane (TPU).

Preferred materials for the second component are: polycarbonate (PC), acrylonitrile-butadiene-styrene (ABS) and polystyrene (PS).

Preferred materials for the third component are: glass fiber reinforced polyamide (PA) or other glass fiber reinforced plastics.

Instead of making the cover completely by injection molding, a blank which has been separately manufactured before can be coated by insert-molding. It is conceivable, for example, that a cap made of sheet metal or a light metal (e.g. aluminum), which substantially has the shape of a conventional click-clack can cap with the spreading metal crenels, is overmolded in the edge region with the softer (second) plastic component. This yields a cover with significantly improved tightness against the spilling out of liquids or gases from the can to be sealed with it.

FIGS. 2a to 2c show the operation of a closure system according to the invention, in which the lid 10 of the first embodiment for closing the opening 1 is used. The wall portion 2 of the opening 1 to be closed has an annular groove 4 inside, in which the lid 10 is to engage, and which has a shoulder 5a at its lower edge.

When introducing the lid 10 from above into the opening 1, the edge portion 12 will abut with the latching ring 19 against the shoulder 5a. As a result, the user knows that he has reached the intended axial end position of the lid 10 for locking. If the user now presses the front wall 11 down (best by a force $F_1$ on the handle member 15 vertically downwards), the front wall 11 switches from its convex bistable state shown in FIG. 2a in its concave bistable state shown in FIG. 2b. Due to the stiffness of the lid material in the transition region between the front wall 11 and the edge portion 12, which is preferably supported by material thickening, the angle μ remains constant in this flipping over process so that the edge portion 12 flaps slightly laterally outwards and presses the latching ring 19 into the groove. As a consequence, the material spans in the expansion portions 14 into a widened state in a plan view.

The outer diameter of the edge portion 12 increases during the folding process between FIGS. 2a and 2b from a to a'. In the concave front wall position of FIG. 2b, the latching ring 19 presses laterally from the inside into the annular groove 4 of the opening wall 2 and thus locks the lid 10 in its closed position. In FIG. 2c, the engagement of the latching ring 19 into the groove 4 is shown again in detail.

To release the opening 1, the front wall 11 is pulled with a force $F_2$ upwards (preferably by gripping the handle strap 15), whereby the lid 10 snaps back into its original state and can be pulled out of the opening 1 since its outer diameter is again reduced to the value a.

A particular advantage of the closure system according to FIGS. 2a to 2c resides in that the cover 10 cannot be opened by pressure from the outside on its front wall 11. Unlike the conventional click-clack cans, the lid 10 in FIG. 2b is not releasable by a vertical pressure on its front wall 11 from above (for example by shocks during transport). Instead, the front wall 11 must be lifted by a targeted upward pulling of the handle strap 15 from its locked position. As a result, the security of the cover 10 is increased against unintentional opening. Preferably, the cover 10 may be completely within a pipe end to be closed if, as shown in FIGS. 2a-c, the groove 4 and the shoulder 5a are arranged correspondingly far inside.

Figure 4B:
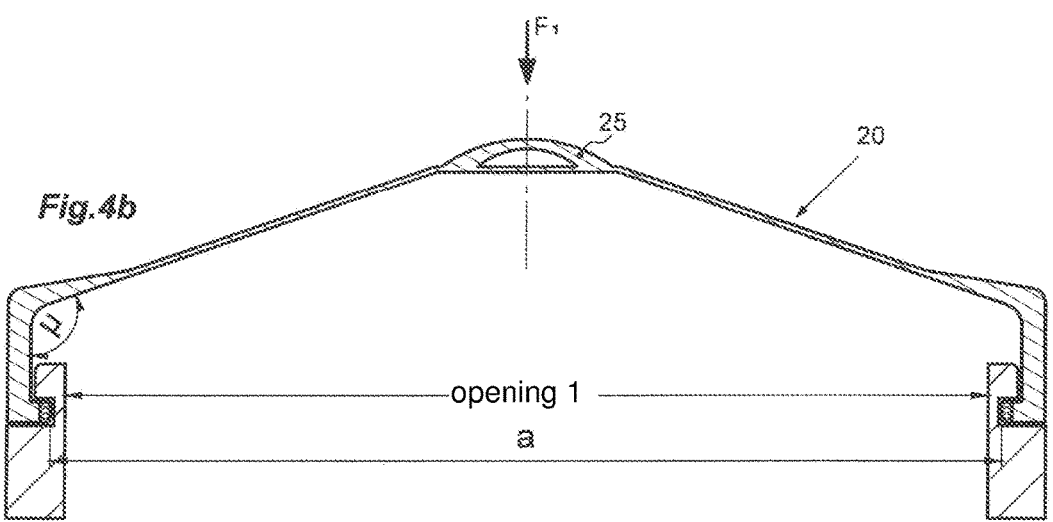
FIG. 4b is a cross-sectional view of the closure system of FIG. 4a in the closed position.
Figure 4C:
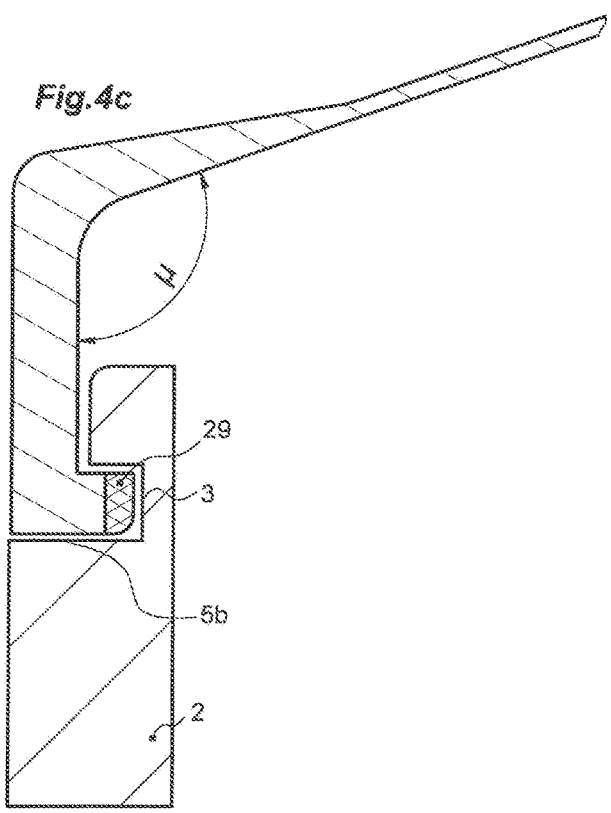
FIG. 4c shows an enlarged detail of FIG. 4b.

In the second embodiment shown in FIGS. 3 and 4, the cover according to the invention is no longer a lid engaging from the inside into the opening to be closed, but formed as a cap 20 embracing the opening 1 to be closed from the outside. FIGS. 3a to 3f all show the cap 20 in its convex position cambered outwardly (i.e. opposite to the direction of attachment), i.e. its closed position. It is additionally shown in FIG. 3f how in this position, a latching into the opening wall 2 to be closed is possible, which will be explained in more detail in FIGS. 4a to 4c.

As with the lid 10 in the first embodiment, the cap 20 has a substantially circular or disc-shaped front wall 21, which continues into an annular edge portion 22. In the transition region between the front wall 21 and the edge portion 22, the material thickens again, as can be seen in FIGS. 3e and 3f, to ensure that the angle μ (not drawn in FIGS. 3e and 3f but shown in FIG. 4a) remains constant also in the concave snapping position.

In addition, the edge portion 22 again comprises on its circumference intermittently molded expansion portions 24 which alternate equidistantly with interposed intermediate portions 23 and which are formed from the second material component, which is softer than the first material component used for the intermediate portions 23. As with the first embodiment, the softer material of the expansion portions 24 allows the edge portion 22 to enlarge its outer circumference in the concave, i.e. open, snap position of the cap 20. The expansion portions 24 would then no longer have the constant width shown in FIGS. 3a and 3d, but would widen radially outwards (similar to the expansion portions 14 shown in FIGS. 1a and 1d).

Unlike the first embodiment, the latching ring 29 is integrally formed on a lip portion 23a, 24a of the edge portion 22 which lip portion projects by 90° radially inwards. This is because the cap 20 is to surround the opening 1 to be closed from the outside, as will be explained in more detail in FIGS. 3f and 4a-c in particular. The lip portion 24a is contiguous with the expansion portion 24 and made of the softer second material component, while the lip portion 23a adjacent to the intermediate portion 23 is made of the harder first material component. However, it is also possible for the lip portions 23a and 24a to be formed entirely from the softer second material component. Then the entire radial-inwardly extending part of the edge portion 22 would belong to the latching ring 29 or the lip portion would not be there (as in the first embodiment).

FIGS. 4a-c show the operating principle of the cap 20 according to the second embodiment in a closure system according to the invention. The opening 1 to be closed has an annular groove 3 outside on the illustrated wall portion 2. At the lower end of the groove a shoulder 5b is formed, which is not necessary and can also be omitted. FIG. 4a shows the cap 20 in its open, concave position, i.e. with downwardly cambered front wall 21. It has a correspondingly enlarged inner diameter a' of the edge portion 22. This inner diameter a' is greater than the outer diameter of the outer groove 3, so that the cap 20 can be removed from the opening 1 in the opened state of FIG. 4a. By exerting a force $F_2$ acting on the front wall 21 opposite to the direction of attachment (preferably by lifting the handle member 25), the cap 20 snaps back to its first bistable state, which is also shown in FIGS. 3a-f.

Then the front wall 21 has the convex curvature shown in FIG. 4b, i.e. it is cambered upwards against the direction of attachment. The edge portion 22 with the inwardly projecting latching ring 29 then has only an inner diameter a, which is smaller than the outer diameter of the groove. 3 As a result, the cap 20 is firmly engaged with the opening wall 2 to be closed and snaps back into its second bistable state only when a force $F_1$ acting in the direction of attachment is exerted on the front wall 21.

As shown in more detail in FIG. 4c, the latching ring 29 made of the softer second material component effects a firmly clamping attachment of the edge portion 22 in the outer groove 3. Because of its elastic material properties the latching ring 29 also acts as a sealing ring to prevent the discharge of gases or liquids from the opening 1.

FIGS. 5a-f are essentially constructed as in FIGS. 3a-f and show a cover 30 which, according to a third embodiment of the invention, can be used both as a cap and as a lid. In contrast to the cap 20 according to the second embodiment, the cover 30 according to the third embodiment comprises, in addition to the radial-inwardly projecting latching ring 39a, a radial-outwardly projecting latching ring 39b made of the softer second material component. This is particularly well illustrated in FIGS. 5e and 5f and has the advantage that the cover 30 can be used according to the principles explained in FIGS. 2a-c and 4a-c both as a cap (then FIG. 5a shows the closed position) and as a lid (then the FIG. 5a shows the open position). Thus, this variant of the invention is also characterized by the advantage of a particularly versatile usability.

In the illustrated embodiment, the edge portion 32, both in its expansion portions 34 and in the intermediate portions 33 has a radially extending lip portion 33a,b, 34a,b, which ends on both sides in the latching rings 39a, 39b. Here again, the lip portion 33a,b can also be injection-molded from the softer second material component, whereby the inner and outer latching rings 39a, 39b are each widened. The latching ring 39a, 39b would then connect directly to the middle portion of the edge portion 32 extending in the direction of attachment.

In summary, the present invention relates to a cover 10, 20, 30 with a bistable folding mechanism made of plastic material having at least two material components. The cover 10, 20, 30 can be produced integrally in an injection molding process using multi-component technology. At the transition region between the front wall 11, 21, 31 and the edge portion 12, 22, 32 the plastic material (preferably due to higher material thickness) is sufficiently stiff to ensure that an angle μ included in the transition region between the side wall 11, 21, 31 and the edge portion 12, 22, 32 remains constant in both bistable states. Expansion portions 14, 24, 34 provided in the edge portion 12, 22, 32 ensure that the outer circumference of the edge portion 12, 22, 32 can increase/decrease from one bistable state to the other bistable state.

LIST OF REFERENCE NUMBERS

1 opening
2 side wall
3 outer groove
4 inner groove
5a, b shoulder
10, 20, 30 cover
11, 21, 31 front wall
12, 22, 32 edge portion
13, 23, 33 intermediate portions (hard)
14, 24, 34 expansion portions (soft)
15, 25, 35 handle member
23a, 33a lip portion inside (hard)
24a, 34a lip portion inside (soft)
33b lip portion outside (hard)
34b lip portion outside (soft)
19, 39b latching ring outside (soft)

The invention claimed is:

1. A cover configured for clamping attachment to a wall region defining an opening, the cover comprising:
   a front wall deformable between a first stable, downwardly cambered state and a second stable, upwardly cambered state;
   an annular edge portion having a larger outer circumference when said front wall is in said first stable state than when said front wall is in said second stable state, said annular edge portion effecting a clamping attachment of the cover to the wall region by pressing said annular edge portion against the wall region from inside the opening in said first stable state, or from outside the opening in said second stable state;
   said annular edge portion having at least one expansion portion made of a second plastic material component and a remaining edge portion made of a first plastic material component, said second plastic material component being softer and/or more elastic than said first plastic material component, enabling an increase of an outer periphery of said annular edge portion in said first stable state relative to said second stable state; and
   said front wall transitioning into said annular edge portion at a constant angle that remains constant in both of said first stable state and said second stable state.

2. The cover according to claim 1, wherein said constant angle is greater than 90°.

3. The cover according to claim 1, wherein said constant angle is between 95° and 175°.

4. The cover according to claim 1, wherein the cover has characteristics of having been integrally made of plastic material by a multi-component injection molding process.

5. The cover according to claim 1, wherein said edge portion includes a plurality of expansion portions made of said second plastic material component, said expansion portions extending from a transition portion between said edge portion and said front wall and alternating equidistantly with intermediate portions of said first plastic material component of said remaining edge portion.

6. The cover according to claim 5, wherein said expansion portions extend radially obliquely or vertically downwards from said transition portion.

7. The cover according to claim 1, wherein said annular edge portion has a middle portion inside and outside of a region with said expansion portion, said middle portion extends axially in said direction of attachment, and a lip portion is disposed adjacent said middle portion and extends at least one of inwardly or outwardly in a radial direction.

8. The cover according to claim 7, which further comprises a latching ring being integrally provided at an end region of said annular edge portion or said lip portion, said latching ring peripherally surrounding said annular edge portion and being formed of a material being softer or more elastic than said first material component.

9. The cover according to claim 8, wherein said latching ring is made of said second material component.

10. The cover according to claim 8, wherein said lip portion includes a radial-inwardly extending lip portion and a radial-outwardly extending lip portion both being formed as latching rings or having radial-inwardly or radial-outwardly projecting latching rings integrally formed thereon.

11. The cover according to claim 1, wherein said front wall has a handle member configured for use when attaching the cover on and detaching the cover from the opening.

12. The cover according to claim 11, wherein said handle member is formed as a bow-shaped handle.

13. A closing system, comprising:
a cover according to claim 1; and
an opening of a container to be closed by clamping the cover to a wall region of the container;
the wall region having a groove for engaging a clamping element of said annular edge portion.

14. The closing system according to claim 13, wherein said clamping element is a latching ring being integrally provided at an end region of said annular edge portion, said latching ring peripherally surrounding said annular edge portion and being formed of a material being softer or more elastic than said first material component.

15. A cover configured for clamping attachment to a wall region defining an opening, the cover comprising:
a front wall deformable between a first stable, downwardly cambered state and a second stable, upwardly cambered state;
an annular edge portion having a larger outer circumference when said front wall is in said first stable state than when said front wall is in said second stable state, said annular edge effecting a clamping attachment of the cover to the wall region by pressing said annular edge portion against the wall region from inside the opening in said first stable state, or from outside the opening in said second stable state;
said annular edge portion having at least one expansion portion made of a second plastic material component and a remaining edge portion made of a first plastic material component, said second plastic material component being softer and/or more elastic than said first plastic material component, enabling an increase of an outer periphery of said annular edge portion in said first stable state relative to said second stable state; and
a transition portion from said front wall into said annular edge portion and a remaining area, said transition portion having a material thickness at least in partial areas being greater than a material thickness in said remaining area.

16. The cover according to claim 15, wherein said front wall has a minimum material thickness, and said material thickness of said transition portion is a multiple of said minimum material thickness of said front wall.

17. The cover according to claim 15, wherein said front wall has a minimum material thickness, and said material thickness of said transition portion is approximately three to four times as large as said minimum material thickness of said front wall.

18. A cover configured for clamping attachment to a wall region defining an opening, the cover comprising:
a front wall deformable between a first stable, downwardly cambered state and a second stable, upwardly cambered state;
an annular edge portion having a larger outer circumference when said front wall is in said first stable state than when said front wall is in said second stable state, said annular edge effecting a clamping attachment of the cover to the wall region by pressing said annular edge portion against the wall region from inside the opening in said first stable state, or from outside the opening in said second stable state;
said annular edge portion having at least one expansion portion made of a second plastic material component and a remaining edge portion made of a first plastic material component, said second plastic material component being softer and/or more elastic than said first plastic material component, enabling an increase of an outer periphery of said annular edge portion in said first stable state relative to said second stable state;
said front wall being at least predominantly formed of said first plastic material component; and
a transition portion from said front wall into said edge portion being formed at least in partial areas, of a third plastic material component being harder than said first plastic material component.

19. The cover according to claim 18, wherein said annular edge portion has a substantially uniform thickness.

* * * * *